US008978727B2

(12) United States Patent
Schaefer

(10) Patent No.: US 8,978,727 B2
(45) Date of Patent: Mar. 17, 2015

(54) SUPPORT FOR AT LEAST ONE BRUSH ELEMENT AND LABELING MACHINE

(75) Inventor: Helmut Schaefer, Regensburg (DE)

(73) Assignee: Krones AG, Neutraubling (DE)

( * ) Notice: Subject to any disclaimer, the term of this patent is extended or adjusted under 35 U.S.C. 154(b) by 1016 days.

(21) Appl. No.: 12/699,156

(22) Filed: Feb. 3, 2010

(65) Prior Publication Data

US 2010/0193133 A1 Aug. 5, 2010

(30) Foreign Application Priority Data

Feb. 3, 2009 (DE) ........................ 10 2009 003 427

(51) Int. Cl.

| | |
|---|---|
| ***B65C 9/00*** | (2006.01) |
| ***B29C 65/00*** | (2006.01) |
| ***F16M 13/00*** | (2006.01) |
| ***B65C 9/36*** | (2006.01) |
| *A46B 5/00* | (2006.01) |
| *A46B 5/06* | (2006.01) |

(52) U.S. Cl.
CPC ... *B65C 9/36* (2013.01); *A46B 5/00* (2013.01); *A46B 5/06* (2013.01)
USPC ........................................ 156/349; 248/309.1

(58) Field of Classification Search
CPC ............... A46B 5/00; A46B 5/06; B65C 9/36
USPC ......................................................... 156/349
See application file for complete search history.

(56) References Cited

U.S. PATENT DOCUMENTS

| | | | | |
|---|---|---|---|---|
| 4,196,691 | A * | 4/1980 | Imazeki | 116/309 |
| 5,815,876 | A | 10/1998 | Overseth | |
| 7,365,470 | B1 * | 4/2008 | Eger et al. | 310/240 |
| 2003/0135946 | A1 * | 7/2003 | MacLean | 15/176.4 |
| 2008/0202545 | A1 * | 8/2008 | Purvis et al. | 132/120 |

FOREIGN PATENT DOCUMENTS

| | | | |
|---|---|---|---|
| DE | 523333 | | 4/1931 |
| DE | 3511910 | A1 | 2/1986 |
| DE | 68907262 | T2 | 11/1993 |
| DE | 4234439 | A1 | 4/1994 |
| DE | 29817657 | U1 | 12/1998 |
| DE | 19726970 | A1 | 1/1999 |
| DE | 10052119 | A1 | 5/2002 |
| DE | 10233055 | A1 | 2/2004 |
| DE | 102008036676 | A1 | 2/2010 |
| EP | 0339933 | B1 | 4/1989 |
| EP | 1553045 | | 7/2005 |

* cited by examiner

*Primary Examiner* — Philip Tucker
*Assistant Examiner* — Vicki Wu
(74) *Attorney, Agent, or Firm* — Simpson & Simpson, PLLC

(57) ABSTRACT

A support for at least one brush element. The support includes at least one carrier, to which the at least one brush element is removably attached on a flat front side of the at least one carrier, and at least one bar, which is removably attached to the at least one carrier on a rear side opposite the front side of the at least one carrier. To the rear side of the at least one carrier at least one elastic locking element is attached, which is lockable with a plurality of parallel flutes of the at least one bar.

19 Claims, 5 Drawing Sheets

SUPPORT FOR AT LEAST ONE BRUSH ELEMENT AND LABELING MACHINE

CROSS-REFERENCE TO RELATED APPLICATIONS

This patent application claims priority of German Patent Application No. 10 2009 003 427.7, filed on Feb. 3, 2009, the application is incorporated herein by reference.

FIELD OF THE INVENTION

The present invention relates to a support for at least one brush element.

The present invention also relates to a labeling machine with a plurality of such supports for brush elements.

BACKGROUND OF THE INVENTION

German Patent Application No. 35 11 910 A1 discloses a method for the creation of brush arrays of constant density out of bristled elements as well as a brush array created by this method. The brush arrays are formed on a carrier out of the elements. The elements are attached to the carrier with notches and pins and interlock with each other.

German Patent Application No. 10 2008 036 676 discloses a modular brush system and a labeling machine with such brush systems. The brush system includes a carrier with a plurality of receptacles and at least two brush elements removably attached to the carrier. Each brush element includes a brush body, one side of the brush body exhibiting at least one clamping means, which in cooperation with a receptacle of the carrier provides the removable attachment.

German Patent Application No. 42 34 439 A1 discloses a technical brush with a flexible brush carrier. The elements are attached to an endless belt carrier by notches and pins.

German Utility Model No. 298 17 657 U1 discloses a technical, elongated strip brush with a flexible, endless brush body. The strip brush includes clamping means for easy and quick mounting or the attachment of the strip brush to another object without requiring tools. Accordingly a notch is provided, which includes barbs on the inside. The other object is inserted into the notch. The barbs hold the other object in the notch.

German Patent Application No. 197 26 970 A1 discloses a brush body for a rotary brush with a plurality of brush body elements, which can be mounted to a supporting shaft quickly and easily. The brush body is a cylindrical shell formed by two semi-shells with abutting axial edges. Recesses in the semi-shells, connecting elements, which either already are attached to a neighboring shell element or can firmly be attached to it, as well as projections in the recesses serve the purpose of mounting and dismounting the brush body elements. The connecting elements can engage behind the projections. In this way a non-permanent, form-fitting connection along the circumference of the brush body is created between the two semi-shells.

German Patent Application No. 100 52 119 A1 discloses a sector ring brush for keeping clear and/or for cleaning cylindrical bodies, in particular quartz cladding tubes in UV disinfection facilities. The sector ring brush consists of sector elements, whose trimming can be applied before it is mounted into a casing. The sector elements are to be mounted into a ring shaped casing one by one or connected, for example, with connecting bars along the circumference.

German translation 689 07 262 T2 of European Patent No. 0 339 933 B1 discloses a brush section for a rotary finishing brush. Brush elements are removably attached to a hub by root elements in a first or a second substrate of the brush body.

BRIEF SUMMARY OF THE INVENTION

It is an object of the invention to provide a support for at least one brush element, which allows for the reliable, simple, quick and cost-effective removable and adjustable attachment of the at least one brush element.

The above object is achieved by a support for at least one brush element, including at least one carrier, a flat front side is provided on the at least one carrier, the at least one brush element is removably attached on the flat front side of the at least one carrier, at least one bar, which is removably attached to the at least one carrier on a rear side opposite the front side of the at least one carrier; and at least one elastic locking element is attached to the rear side of the at least one carrier. The locking element is lockable with a plurality of parallel flutes of the at least one bar.

It is a further object of the invention to provide a labeling machine with a plurality of supports for brush elements, so that the labeling machine is easily, quickly, reliably and cost-effectively adaptable to different requirements by different objects to be labeled with various types of brush elements and a minimum number of different types of supports.

The above object is achieved by a labeling machine with a plurality of supports for brush elements, including at least one carrier, a flat front side is provided on the at least one carrier, the at least one brush element is removably attached on the flat front side of the at least one carrier; at least one bar with a first arm and a second arm, the first arm is removably attached to the at least one carrier on a rear side opposite the front side of the at least one carrier; at least one elastic locking element is attached to the rear side of the at least one carrier, the locking element is lockable with a plurality of parallel flutes of the first arm of the at least one bar; and a free end of the second arm of the at least one bar is adjustably and removably attached to the labeling machine by the plurality of parallel flutes of the second arm of the at least one bar and by at least one locking element.

The support according to the invention includes at least one carrier, to which at least one brush element is removably attached on a flat front side of the carrier. The support also includes at least one bar, removably attached to the at least one carrier on its rear side, which is opposite the front side of the carrier. The bars each exhibit a plurality of parallel flutes. To the rear side of the at least one carrier at least one elastic locking element is attached, which is lockable with the plurality of parallel flutes of the at least one bar.

In one embodiment, each locking element exhibits two brackets bridged by an elastic crosspiece. Each respective crosspiece is attached to the rear side of the respective carrier. Each bracket has an opening lockable with the plurality of parallel flutes of the respective bar. The respective bar is free to move in the openings of the brackets, if the brackets of the locking element are pressed towards each other in such a way that the openings do not engage the plurality of parallel flutes of the bar. In this case, the openings of the two brackets of a locking element provide a bigger area for the bar, through which the bar is freely movable. In this way the bar can be moved back and forth in the openings of the brackets, until, via the locking elements of the respective carrier, an optimum position for this carrier and thus also an optimum position for the brush elements removably attached to the carrier have been achieved. The unlocking, adjusting, and locking of the bars thus can be done manually without tools. In addition, the brackets of the locking elements may each exhibit an ear for easier seizing and pressing together of the brackets, respectively.

The bars should be angled, thus exhibiting two arms. Each of the arms should exhibit a plurality of parallel flutes in at least one section, respectively, so that both arms are reversibly and adjustably lockable, one arm with the locking elements of the carriers of the brush elements, and the other arm with adequate locking elements of a labeling machine. The bar being angled, adjustments of positions in two dimensions, defined by the orientations of the two arms of the bar, are possible. Angled bars thus provide wider possibilities for adjustment than essentially linear bars. For optimum adjustability an angle of 90 degrees between the two arms of a bar is ideal.

In summary, the support according to the invention not only allows to remove brush elements of various types from the carriers but to exchange them for other brush elements in a reliable, easy, quick, and cost-effective manner. The labeling machine can also easily, quickly, reliably and cost-effectively be adapted according to the different requirements of different objects to be labeled, using only a minimum number of different types of brush elements, bars and carriers. The carriers adjustably attached to the labeling machine can easily, quickly, and without an extensive requirement of tools, be adapted to different objects to be labeled. Also, if necessary, an easy and quick exchange of the carriers is possible. The labeling machine need not be described in detail here, as it is sufficiently known in the state of the art (see, for example, the European Patent Application No. 1 553 045 A1).

In order to further increase the stability of the attachment of the carriers to the bars it may be advantageous for each carrier to exhibit two locking elements instead of only one. The system composed of brush elements, carriers, locking elements and bars can be used in a modular fashion, the carriers and brush elements removably attached one above and/or next to the other with one or plural bars and locking elements. In particular, the brush elements can be in form-fitting contact on the carriers arranged in a modular fashion, the brush system thus providing a homogeneous and uniform bristle surface.

On grounds of materials and costs it is advantageous for the carriers, bars and locking elements to be respectively manufactured as one piece, for example from a metal. At least the carriers and the bars are manufactured by cold working

BRIEF DESCRIPTION OF THE SEVERAL VIEWS OF THE DRAWING

Below embodiments illustrate the invention and its advantages with reference to the attached figures. In the figures, the size ratios of particular elements with respect to each other do not always correspond to the actual size ratios, as some forms are shown in a simplified manner and other forms have been enlarged with respect to other elements for better illustration.

DETAILED DESCRIPTION OF THE INVENTION

Figure 1:
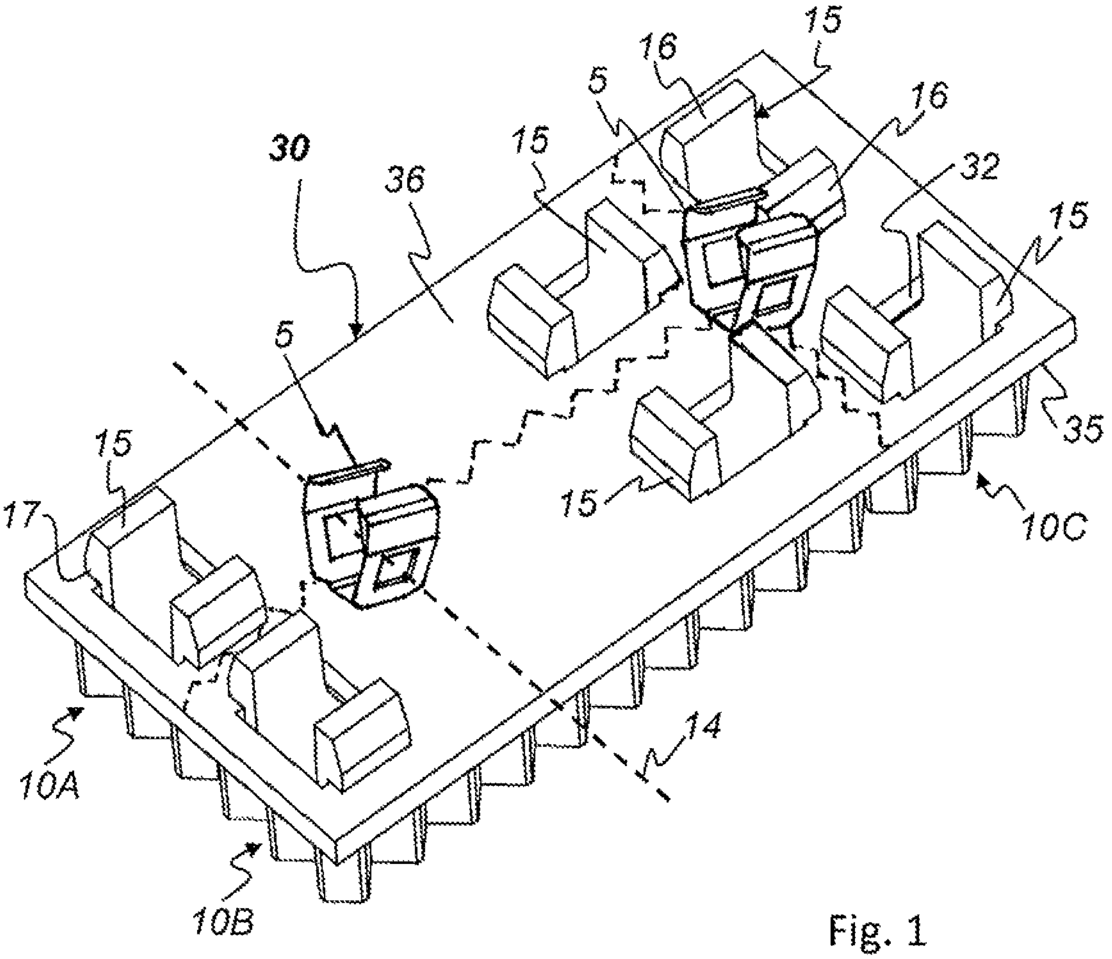
FIG. 1 is a perspective view of an embodiment of a carrier of an embodiment of the support according to the invention with locking elements according to FIG. 4; three brush elements of the state of the art are removably attached to the carrier.

Identical reference numerals are used for like elements of the invention or elements that function in a like manner. For the sake of clarity in each figure only those reference numerals are shown which are necessary for the description of the respective figure. The embodiments shown are only examples of how the apparatus of the present invention can be implemented, and do not limit the invention. It should be appreciated that the term “adapt” is synonymous with terms such as “make fit”, “make suitable”, “adjust”, “modify fittingly”, etc., and such terms may be used interchangeably as appearing in the specification and claims.

FIG. 1 is a perspective view of an embodiment of a carrier 30 for an embodiment of the support 1 according to the invention. It is a view of the rear side 36 of the carrier 30, which in the embodiment shown here is shaped as a rectangular flat board. The rear side 36 of the carrier 30 exhibits two locking elements 5 according to FIG. 4, which are lockable with the plurality of parallel flutes 3 of the bars 2 (see FIG. 2) of the support 1. The position and orientation of one bar 2 with respect to one of the locking elements 5 is only indicated by the longitudinal axis 14 of the bar 2, for reasons of clarity.

Below the carrier 30 three brush elements 10A, 10B, and 10C, also known from the state of the art, are removably locked with the carrier 30 on the front side 35 of the carrier 30. In the figure, only the edge of the front side 35 is visible. The brush elements 10A, 10B, and 10C are in form-fitting contact, indicated by the dashed zig-zag lines on the rear side 36 of the carrier 30. The carrier 30 consists of one piece only, and the zig-zag lines only indicate the arrangement of the brush elements 10A, 10B, and 10C below the carrier.

The carrier 30 exhibits six receptacles 32 or openings, in the embodiment shown of rectangular shape and corresponding in shape and size to the six clamping means 15 introduced therein. The clamping means 15 are provided on the brush elements 10.

In the embodiment shown here each clamping means 15 is provided with two elastic catch hooks 16 which can be pressed towards each other, and which engage behind the carrier 30 such that the brush elements 10A, 10B, and 10C are removably attached in the receptacles 32 of the carrier 30.

The assembly of FIG. 1 demonstrates the modularity of the carriers 30 with the brush elements 10.

It is obvious for someone skilled in the art that modifications or alterations of the carrier 30 with its locking elements 5 and the brush elements 10 can be made without leaving the scope of the invention.

Figure 2:
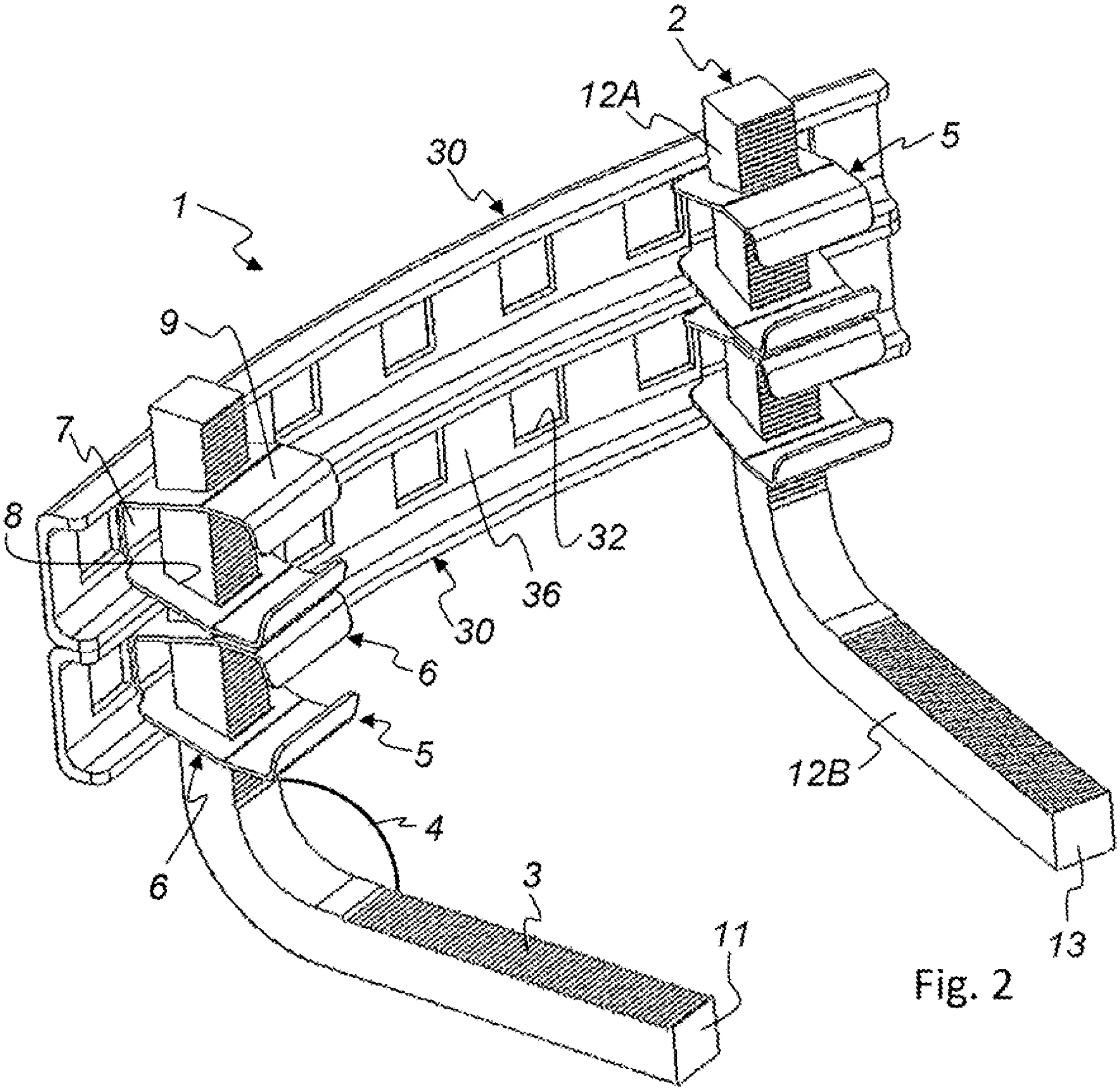
FIG. 2 is a perspective view of an embodiment of the support according to the invention, two carriers being removably attached to two bars by locking elements.

FIG. 2 shows a perspective view of an embodiment of the support 1 according to the invention. Two carriers 30 are removably attached to two bars 2 by two locking elements 5, respectively. The bars 2 each exhibit an angle 4 of 90 degrees. The first 12A and second 12B arms of the bars 2 each exhibit a section with a plurality of parallel flutes 3. The carrier 30 is of a different design than the one of FIG. 1. It exhibits a cross section of a slight U-shape, the front side 35 connecting the two legs of the U-shaped cross section. The rear side 36 opposite the front side 35 is located between the legs of the U-shaped cross section. In the view shown, only the rear side 36, but not the front side 35, is visible. The clamping means 15 of the brush elements 10 (not shown) can be removably attached in the receptacles 32 of the carrier 30, as described in the context of FIG. 1.

The rear side 36 of each carrier 30 exhibits two locking elements 5. The respective first arm 12A of each of the two bars 2 is passed through the openings 8 of the brackets 6 of the respective locking elements 5. In the embodiment shown the plurality of parallel flutes 3 of the first arms 12A are lockable with the edges of the openings 8, if the brackets 6 are not pressed towards each other. The crosspieces 7 of the locking elements 5 are attached to the rear sides 36 of the carriers 30. The free ends 13 of the second arms 12B are removably lockable with locking elements (not shown) provided on a labeling machine. The two carriers 30 are arranged one above the other without a gap, so that brush elements 10 can be attached to the carriers 30 also without a gap in order to provide a gapless brush surface. The assembly of FIG. 2 demonstrates the modularity of the carriers 30 with the bars 2 due to the adjustability of the locking elements 5 on the bars 2.

Figure 3:
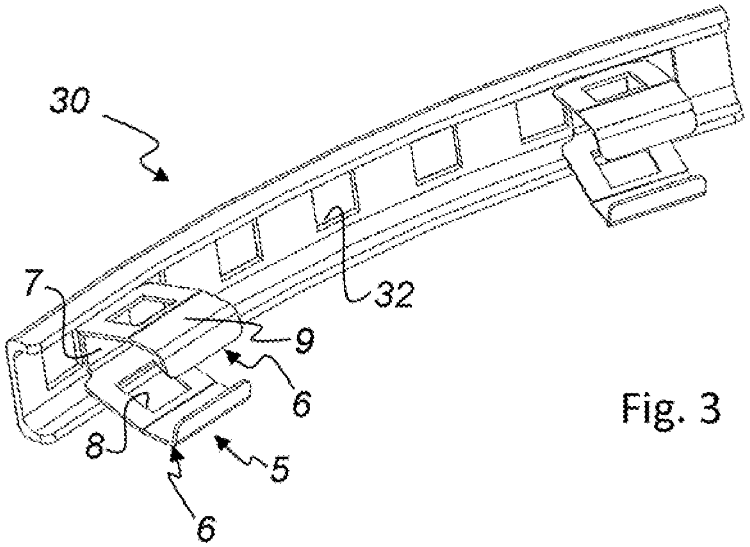
FIG. 3 is a perspective view of a single carrier of the support of FIG. 2.

FIG. 3 is a perspective view of a single carrier 30 of the support 1 of FIG. 2. All elements have been described in previous figures already. The carriers 30 for example can be cut from endless material. As has already been mentioned, the carriers 30 and thus also the brush elements 10 are arranged as modules to form a required brush surface. Consequently, the number of different parts, and also of wear parts, which need to be stocked for a labeling machine, is reduced.

Figure 4:
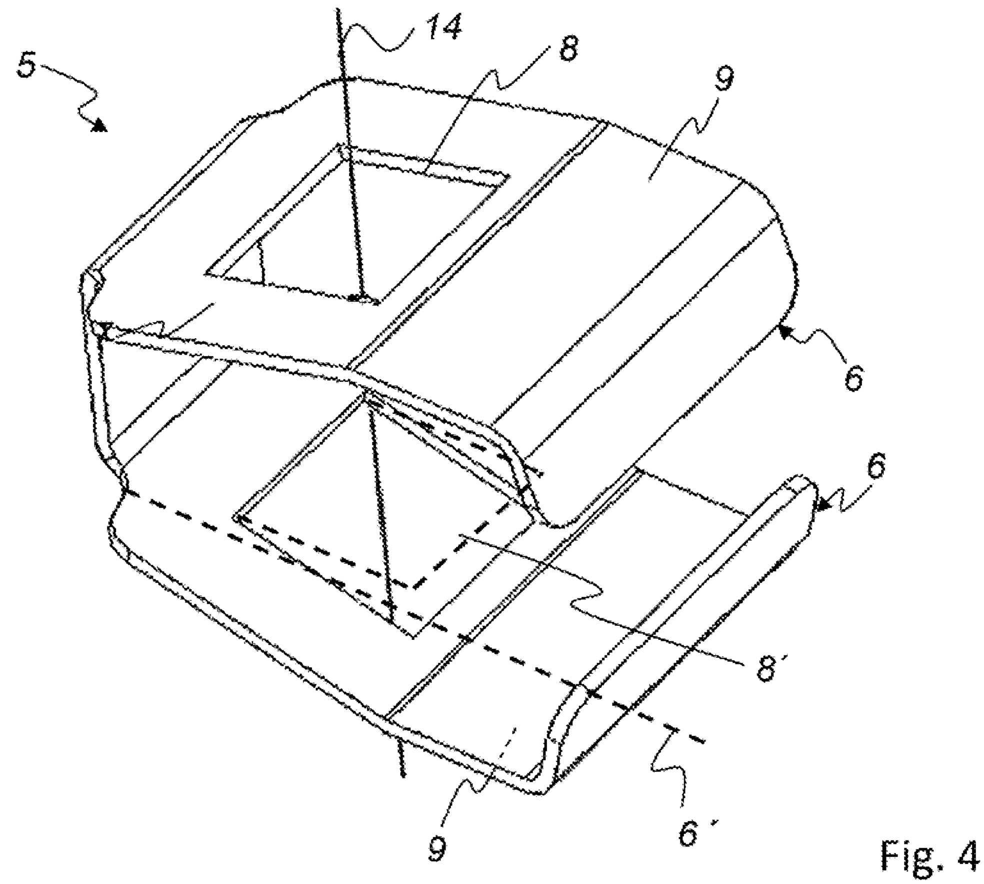
FIG. 4 is a perspective view of a single locking element of the support of FIG. 2.

FIG. 4 is a perspective view of a single locking element 5 of the support 1 of FIG. 2. The opening 8 is rectangular and corresponds to the rectangular cross section 11 (see FIG. 2) of the bars 2 in FIG. 2. However, the openings 8 are somewhat bigger than the cross sections 11 of the bars 2, so that the respective bar 2 can reliably be passed through the openings 8 along its longitudinal axis 14, if the brackets 6 are pressed towards each other. In this case the bigger openings 8 and the smaller cross sections 11 are almost arranged in one plane, and the brackets 6 have been pressed towards each other up to the position indicated by the dashed line 6'.

If the brackets 6 are not pressed towards each other, the area 8' of the opening 8 projected on the cross section 11 of the bar 2 is only minimally bigger than the cross section 11, just so much that the plurality of parallel flutes 3 of the respective bar 2 locks with at least a part of the edge of the respective opening 8.

All other elements have been described in the previous figures already.

Figure 5:
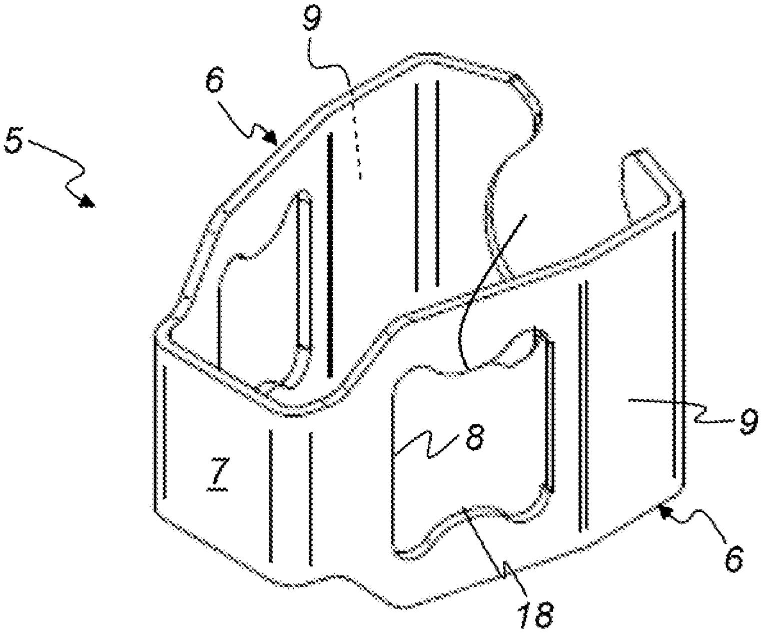
FIG. 5 is a perspective view of another embodiment of a locking element with elevations in the openings.

FIG. 5 shows a perspective view of another embodiment of a locking element 5 with elevations 18 in the openings 8. The elevations 18 facilitate the movement of the locking element 5 along the bar 2. The elevation 18 is in contact with a respective smooth surface (not exhibiting flutes) of a respective bar 2. By the elevation 18 the surface of contact between the bar 2 and the locking element 5 is reduced.

Figure 6:
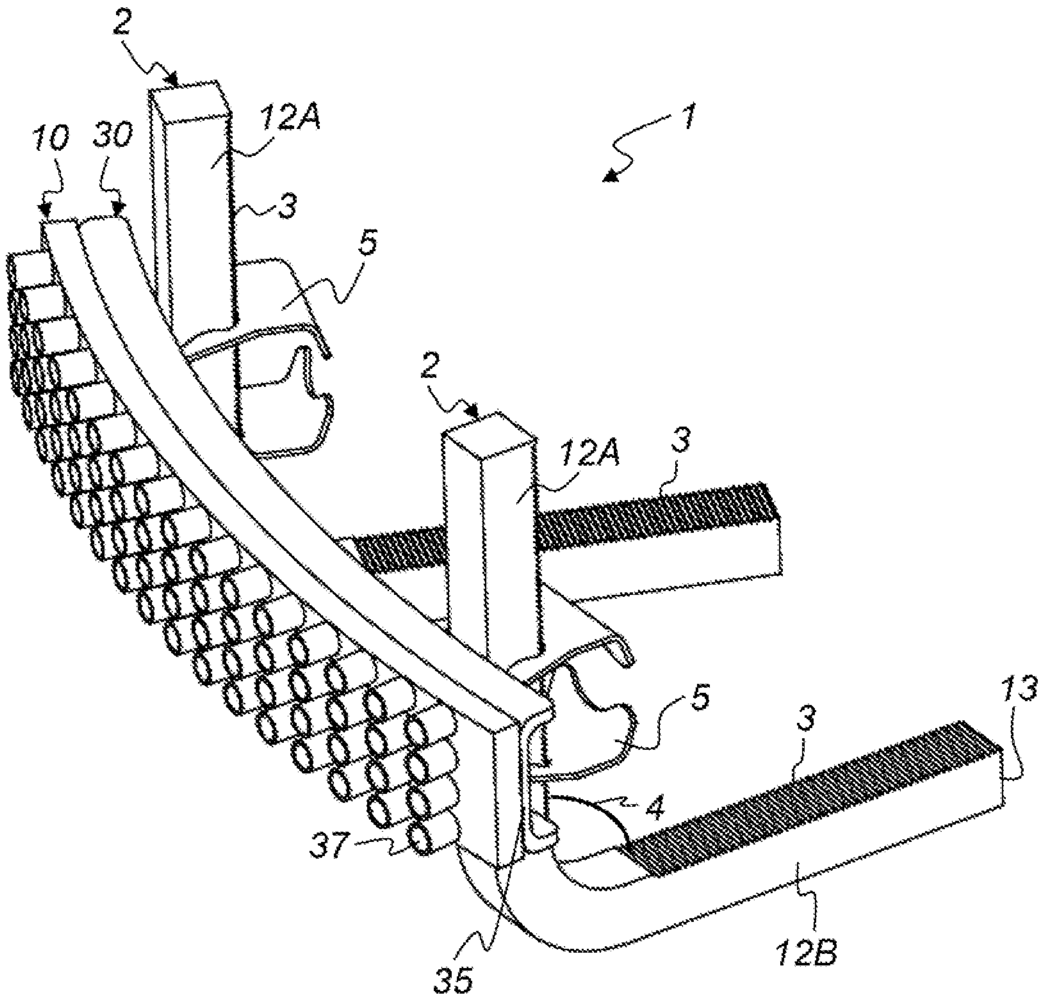
FIG. 6 is a perspective front view of another embodiment of the support according to the invention. A carrier with a brush element is removably attached to two bars by one locking element per bar.

FIG. 6 shows a perspective view from the front of another embodiment of the support 1 according to the invention. A carrier 30 is removably attached to two bars 2 by one locking element 5 per bar 2. A brush element 10 is removably attached on the front side 35 of the carrier 30.

Figure 7:
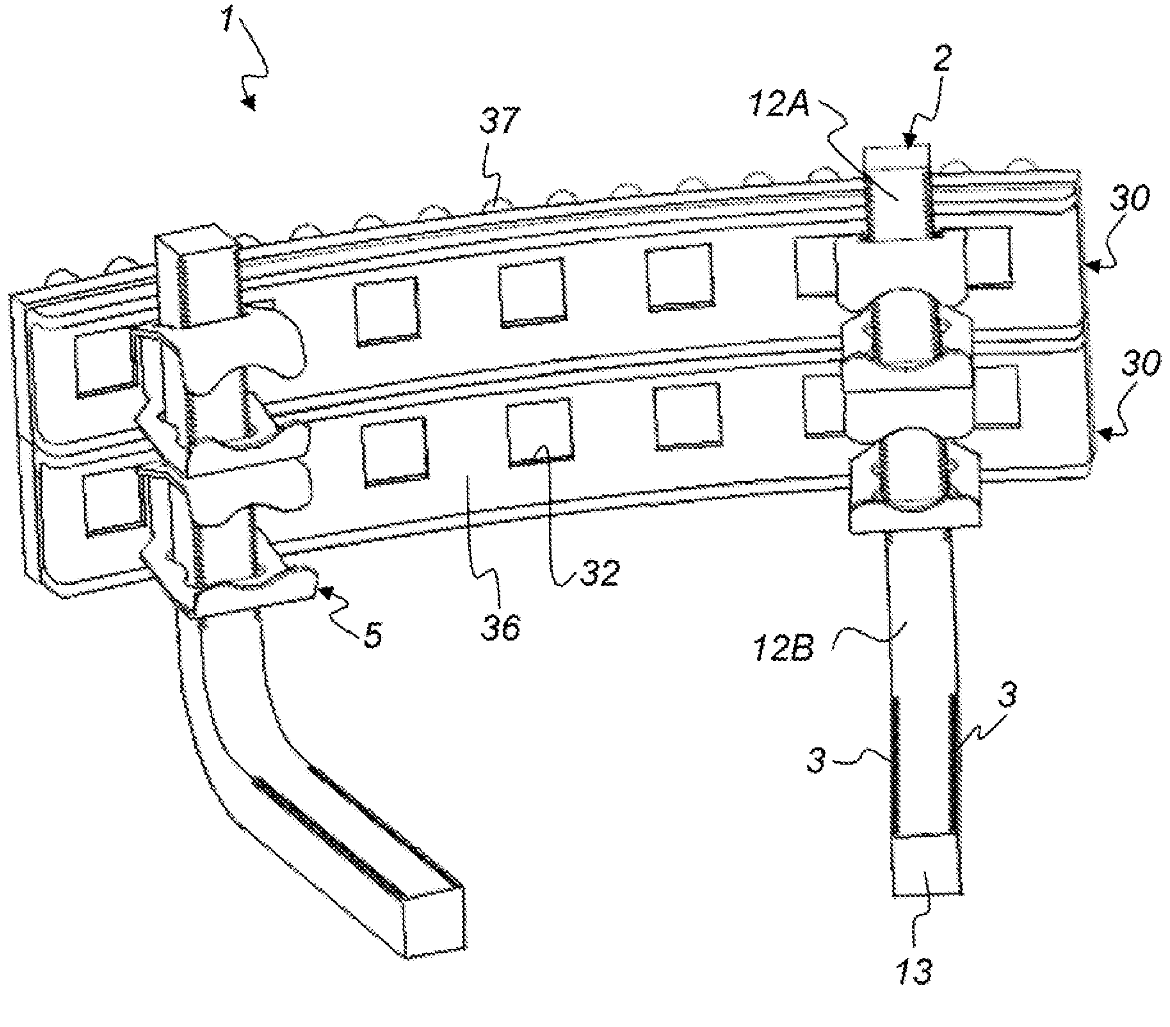
FIG. 7 is a perspective rear view of a further embodiment of the support according to the invention.

FIG. 7 shows a perspective view from the rear of a further embodiment of the support 1 according to the invention. The bars 2 exhibit pluralities of parallel flutes 3 on two respectively opposing edge sections only of a respective bar 2, in contrast to the pluralities of parallel flutes 3 of the previous figures, which extended from one edge section to the opposite edge section of a respective bar 2. The carriers 30 with their locking elements 5 and the brush elements 10 are as described in FIG. 6.

The invention has been described with reference to preferred embodiments. However, it is obvious for a person skilled in the art that modifications and alterations of the invention can be made without leaving the scope of the subsequent claims. In particular, the bars 2 with their pluralities of parallel flutes 3, the carriers 30 with their locking elements 5, the brush elements 10 with their clamping means 15 and/or the receptacles 32 can be designed and/or arranged differently, without leaving the scope of the subsequent claims.

What is claimed is:

1. A support for at least one brush element, comprising:

at least one carrier, a front side is provided on the at least one carrier, wherein the least one brush element is removably attached on the front side of the at least one carrier;

at least one bar, is mounted within a labeling machine, wherein the bar is removably attached to the at least one carrier on a rear side opposite the front side of the at least one carrier; and, at least one elastic locking element, having at least one opening, is attached to the rear side of the at least one carrier, wherein the locking element is lockable with a plurality of parallel flutes of the at least one bar passing through the at least one opening, wherein a brush surface is adapted to different objects to be labeled with the labeling machine.

2. The support according to claim 1, wherein the locking element includes two brackets which are bridged by an elastic crosspiece attached to the rear side of the at least one carrier, wherein each of the two brackets includes an opening, which is lockable with the plurality of parallel flutes of the at least one bar.

3. The support according to claim 2, wherein each bracket includes an ear, by which a force is exertable on the respective bracket.

4. The support according to claim 3, wherein the bar is free to move in the openings of the brackets, if the brackets of the locking element are pressed towards each other in such a way that the openings do not engage the plurality of parallel flutes of the bar.

5. The support according to claim 1, wherein the bar includes a first arm and a second arm which enclose an angle between them, each of the arms respectively having a plurality of parallel flutes in at least one section.

6. The support according to claim 5, wherein the angle is 90 degrees.

7. The support according to claim 1, wherein two locking elements are attached to each carrier.

8. The support according to claim 1, wherein at least two carriers are removably attached to at least one bar as modules, one above and/or next to the other.

9. The support according to claim 8, wherein the brush elements are removably attached to the at least two carriers, which are arranged as modules, and are in form-fitting contact with each other.

10. A support for at least one brush element, comprising:

at least one carrier, a front side is provided on the at least one carrier, wherein the least one brush element is removably attached on the front side of the at least one carrier;

at least one bar, is mounted within a labeling machine, wherein the bar is removably attached to the at least one carrier on a rear side opposite the front side of the at least one carrier, wherein the bar includes a first arm and a second arm which enclose an angle between them; and, at least one elastic locking element, having at least one opening, is attached to the rear side of the at least one carrier, wherein the locking element is lockable with a plurality of parallel flutes passing through the at least one opening, wherein each of the arms respectively has a plurality of parallel flutes in at least one section.

11. The support according to claim 10, wherein two bars are provided and two locking elements are attached to each carrier.

12. The support according to claim 10, wherein the angle is 90 degrees.

13. A labeling machine with a plurality of supports for brush elements, comprising:

at least one carrier, a front side is provided on the at least one carrier, wherein the least one brush element is removably attached on the front side of the at least one carrier;

at least one bar is mounted in the labeling machine, wherein the at least one bar is removably attached to the at least one carrier on a rear side opposite the front side of the at least one carrier; and, at least one elastic locking element, having at least one opening, is attached to the rear side of the at least one carrier, wherein the locking element is lockable with a plurality of parallel flutes of the at least one bar passing through the at least one opening, wherein a brush surface is adapted to different objects to be labeled with the labeling machine.

14. The labeling machine according to claim 13, wherein two bars are provided, and two locking elements are attached to each carrier and each locking element wherein the locking element is lockable with a plurality of parallel flutes of the at least one bar passing through the at least one opening of the locking element.

15. The labeling machine according to claim 13, wherein the bar includes a first arm and a second arm which enclose an angle between them.

16. The labeling machine according to claim 15, wherein the angle is 90 degrees.

17. The support according to claim 1, wherein a plurality of receptacles is provided on the carrier for removably attaching the at least one brush element.

18. The labeling machine according to claim 13, wherein a plurality of receptacles is provided on the carrier for removably attaching the at least one brush element.

19. The labeling machine according to claim 15, wherein the first arm has the least one carrier removably mounted and the second arm is adjustably and removably attached to the labeling machine by the plurality of parallel flutes of the second arm of the at least one bar and by the at least one locking element.

* * * * *